April 19, 1966

N. V. BEAMAN 3,246,625

APPARATUS FOR GREASING BAKING PANS

Filed Aug. 14, 1962

INVENTOR.
NORMAN V. BEAMAN
BY Forrest J. Lilly
Attorney

April 19, 1966  N. V. BEAMAN  3,246,625
APPARATUS FOR GREASING BAKING PANS
Filed Aug. 14, 1962  3 Sheets-Sheet 2

INVENTOR.
NORMAN V. BEAMAN
BY Forrest J. Lilly
Attorney

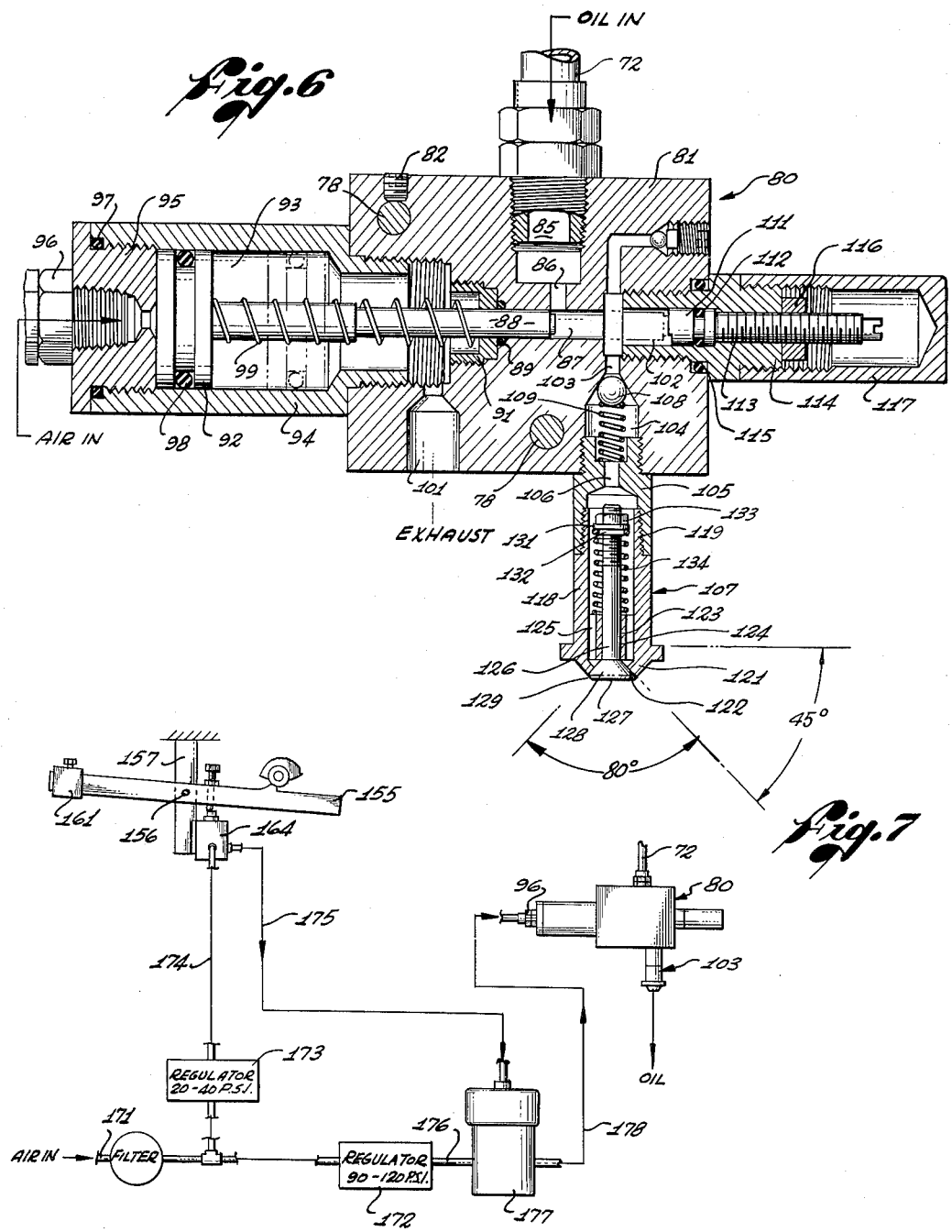

United States Patent Office 3,246,625
Patented Apr. 19, 1966

3,246,625
APPARATUS FOR GREASING BAKING PANS
Norman V. Beaman, La Habra, Calif., assignor to Par-Way Mfg. Co., Los Angeles, Calif., a corporation of California
Filed Aug. 14, 1962, Ser. No. 216,898
11 Claims. (Cl. 118—2)

The present invention relates generally to apparatus for coating the interior surfaces of pans with oil or grease for use in baking bread, muffins, cakes, and like products in commercial bakeries. More particularly, the present invention relates to apparatus for spray coating baking pan interiors with oil or grease automatically and in rapid sequence as an incident to movement of the pans through the apparatus.

In commercial bakery operations, it is standard practice to grease the inside surfaces of baking pans by applying a coating of oil or grease to prevent the baked product sticking to the pan. In view of the large volume output of such bakeries, it is desirable to effect the greasing operation expeditiously and with a minimum of labor, and to apply a thin even coating to only those surfaces of the pans contacted by the baked product. According to the present invention, the greasing operation preferably applies an oil or grease coating to the pan surfaces by a spray of greasing liquid only, under high pressure and without air admixed therewith, providing substantially uniform dispersion of the liquid in the form of tiny droplets which are sprayed in a single quick burst from a nozzle or nozzles spaced from the pan.

It is an object of the present invention to provide improved apparatus for rapidly and uniformly greasing the surfaces of baking pans by spraying a coating of oil or grease on the dough contacting surfaces thereof.

Another object of this invention is the provision of an improved pan greasing apparatus adapted for rapid and automatic operation to apply a thin and uniform coating over the dough contacting surfaces only of baking pans.

A further object of this invention is the provision of an improved baking pan greasing apparatus provided with simple but effective universal adjustment means for locating oil spraying nozzles relatively to the pans to be greased.

Yet another object of this invention is to provide an improved baking pan greasing apparatus, including means for synchronizing the operation of a means for spraying oil or grease on the dough contacting surfaces of the pans with movement of the pans relative to the spray means and applying a uniform greasing coating by a single rapid burst of liquid material dispersed in fine droplets.

These and other objects and features of the invention will be readily apparent to those skilled in the art from the following specification and the appended drawings, in which:

FIG. 6 is an enlarged sectional view through the pump and nozzle for spraying the greasing material; and FIG. 7 is a diagrammatic representation of the pneumatic system for effecting the spraying operation.

Figure 1:
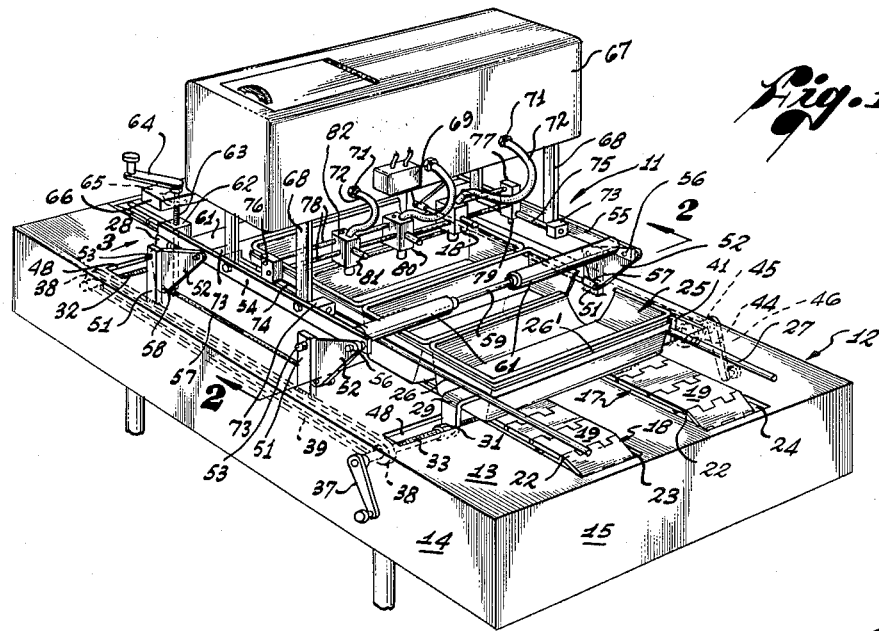
FIG. 1 is a perspective view of baking pan greasing apparatus according to the present invention.

In the exemplification of the present invention selected for illustration in the drawings, the pan greasing apparatus 11 includes a supporting table 12 having a top platform 13 with an integral skirt depending therefrom made up of side plates 14 and end plates 15. On the upper surface of the platform 13 are mounted longitudinally extending bearing and guiding strips 16 arranged in pairs at opposite sides of the longitudinal axis of the platform 13. These strips are preferably formed of a nonmetallic material providing a smooth sliding surface, such as Micarta, and have slidably supported thereon a pair of spaced endless belts 17 and 18 made up of a plurality of pivotally interconnected links 19. The links 19 have bars 21 integrally connected to their under surfaces, as by welding, and each pair of bearing strips 16 is spaced apart a sufficient distance to accommodate the bars 21 of the associated endless belt therebetween. The bars 21 are also received between the teeth of sprockets 22 disposed adjacent the opposite ends of the platform 13 and driven in tandem to effect concurrent movement of the belts 17 and 18 longitudinally of the platform 13. The platform 13 is cutaway to provide openings, as at 23 and 24, for the passage of the endless belts 17 and 18 therethrough.

A set of baking plans is indicated generally at 25 in FIG. 1, in place on the endless belts 17 and 18 passing through the greasing apparatus. These sets may comprise any number of individual pans which are rigidly connected together, as by a strap 26' welded thereto, so that the set passes through the greasing apparatus and the baking operations as a unit.

Figure 2:
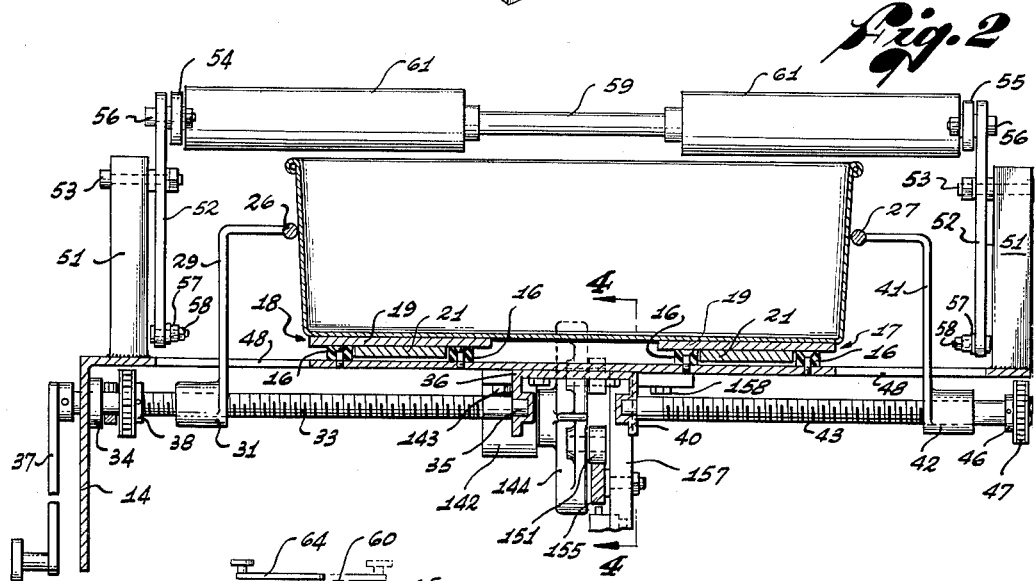
FIG. 2 is a transverse vertical sectional view at the line 2—2 of FIG. 1.

Lateral guide means for the pan sets are provided by adjustable guide rods 26 and 27 which are movable transversely of the table 12. The lateral guide rod 26 is rigidly secured to the ends of a pair of arms 28 and 29, the lower ends of which are integrally attached to threaded hubs 31 forming traveling nuts on lead screws 32 and 33. Referring to FIG. 2, the lead screw 33 is mounted for rotation in a bearing 34 mounted on a side plate 14 and a bearing 35 within a bracket 36 rigidly bolted or otherwise secured to the under surface of the platform 13. A handle 37 is rigidly mounted on the lead screw 33 at the end thereof disposed on the outside of the side plate 14. The lead screw 32 is similarly mounted, and the lead screws 32 and 33 have sprockets 38 rigidly secured thereto which are interconnected by a chain 39 to secure concurrent rotation of the lead screws 32 and 33 by the handle 37, to effect concurrent travel of the nuts 31 mounting the arms 28 and 29 to effect lateral movements of the guide bar 26 while it remains parallel to the longitudinal axis of the table 12.

The lateral guide rod 27 is mounted similarly to the guide rod 26, as shown more particularly in FIG. 2, wherein the guide rod 27 is shown mounted on the upper end of an angle support 41, whose lower end is integrally connected to and supported by a threaded hub 42 forming a traveling nut on a lead screw 43. The lead screw 43 is rotated by a handle 44 in a bearing 40 in the bracket 36 and a bearing 45 mounted on the opposite side wall 14. A sprocket 46 and chain 47 are connected to a sprocket on a second lead screw conforming to the lead screw 32, and serving to advance the opposite end of the lateral guide rod 27. The platform 13 is provided with four slots 48 through which the supporting arms for the guide rods extend.

Upon the top surface of the platform 13 are rigidly secured, as by welding, four supporting posts 51 symmetrically disposed as at the corners of a horizontal rectangle whose sides are parallel to the sides and ends 14 and 15 of the table 12. Upon each of the posts 51 is pivotally mounted one corner of a triangular plate 52, as at 53. Supporting bars 54 and 55 are pivotally mounted to similar corners of the plates 52 at each side of the table 12, as at 56. The third similar corners of the plates 52 at opposite sides of the table 12 are interconnected by rods 57 pivotally connected to the plate corners as at 58. The plates 52, bars 54, and rods 57 thereby form vertically disposed parallelograms of constant sides and variable angles, and with the parallelograms pivotally mounted at 53 on the posts 51. The bars 54 and 55 are joined into a rigid horizontal rectangle by a pair of bars 59 rigidly secured adjacent to the opposite ends of the bars 54 and 55. Rollers 61 are rotatably mounted on the rods 59 above the pan sets 25 to prevent the sets from buckling upwardly where they might damage the spray nozzles to be hereinafter described.

Figure 3:
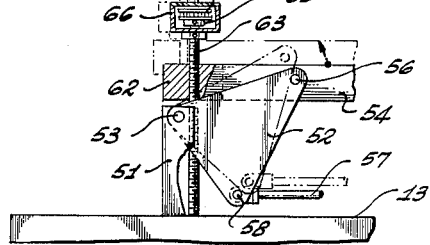
FIG. 3 is a detail view, partly in section, in the direction of the arrow 3 of FIG. 1.

A pair of blocks 62, only one of which is shown in FIGS. 1 and 3, are mounted at similar ends of the bars 54 and 55, and in these blocks are threaded screws 63 whose ends engage the top surface of the platform 13 to support the parallelograms formed by the plates 52, bars 54 and 55, and rods 57 in adjusted positions with respect to the platform. The screw 63 is shown in FIG. 1 as having a handle 64 connected thereto, and a sprocket 65 on the screw 63 is interconnected by a chain 60 to a similar sprocket on the other supporting screw mounted at the end of the bar 55, so that rotation of the handle 64 will effect concurrent rotation of the two adjusting screws to adjust the positions of the parallelograms relative to the platform 13. The sprockets 65 and their interconnecting chain are enclosed within a sheet metal housing 66 extending across the bars 54 and 55 at the upper ends of the screws 63.

A reservoir 67 for greasing material is supported on the bars 54 and 55 by means of struts 68 bolted thereto. A heater, not shown, is disposed within the reservoir 67 and is controlled by a thermostat 69 to maintain the oil or grease within the reservoir 67 at a desired spray temperature. The reservoir 67 has a plurality of outlets 71 connected by flexible tubing 72 to the inlet ports of the pumps for the spray nozzles.

Rigidly secured to the opposed faces of the bars 54 and 55 are pairs of longitudinally spaced supporting blocks 73, between which are mounted supporting rods 74 on the bar 54 and 75 on the bar 55. Upon the rods 74 and 75 are slidably mounted supporting blocks 76 and 77, and between the blocks 76 and 77 extend transverse supporting rods 78. The rods 78 are rigidly mounted in the supporting blocks 76 and 77, but the blocks themselves are slidably and adjustably mounted on the rods 74 and 75 and are held in adjusted position by set screws 79. Slidably mounted on the rods 78 are the body portions 81 of oil pump and spray nozzle units 80, which are thus adjustable transversely of the table 12, being held in adjusted position by set screws 82. Three of the pump and nozzle units are shown in FIG. 1 as mounted in spaced relation on the rods 78, so that the spray therefrom will cover the entire surface of the baking pans passing therebeneath. It will be apparent that any desired number of these units may be used, depending upon the size of the pans to be coated.

The oil pump and spray nozzle unit 80 is shown in enlarged section in FIG. 6. The greasing oil inlet is shown at 85 connected to the flexible tubing 72 and feeding through a passage 86 into a pump cylinder chamber 87 in which reciprocates the pump piston 88. A sealing O-ring 89 surrounds the piston 88 and is maintained in position by a retainer cup 91 having a central opening through which the piston 88 slides. The oil piston 88 is rigidly secured to an air piston 92 to move therewith, the air piston sliding in a cylinder chamber 93 formed in a plug 94 which is threaded into the body portion 81. The cylinder 93 is closed by an end plug 95 receiving an air inlet fitting 96 and sealed by an O-ring 97. A sealing O-ring 98 is disposed in the periphery of the piston 92 to form a seal between the piston and the cylinder walls. A compression spring 99 surrounds the oil piston 88 and biases it and the air piston toward the left as viewed in FIG. 6. An exhaust port 101 connects the inactive face of the piston 92 to atmosphere.

The oil cylinder 87 has an enlarged portion 102 from which an outlet passage 103 leads to a chamber 104 which is closed by a mounting plug 105 having an outlet passage 106. A spray nozzle 107 is mounted in the plug 105 in communication with the outlet passage 106. A check ball 108 is biased by a spring 109 to close the outlet passage 103 and is effective to prevent flow of oil out of the pump when the nozzle 107 is removed. Within the enlarged portion 102 of the oil cylinder 87 is mounted an adjustable stop 111 having a sealing O-ring 112 thereabout. The stop 111 is mounted on a screw 113 which is adjustably threaded in a plug 114 and locked by a nut 116. The plug 114 is sealed to the body portion 81 by an O-ring 115. An enclosing cap 117 threads on the end of the plug 114. The stop 111 is shown in its extreme adjusted position to permit maximum movement to the oil piston 88 and, therefore, maximum discharge from the pump.

The nozzle 107 comprises a hollow cylindrical body portion 118 having a threaded end 119 by which the nozzle is mounted, and a discharge end 121 of frusto-conical shape having a discharge opening defined by a frusto-conical surface 122 disposed to form preferably substantially a right angle with respect to the exterior frusto-conical surface of the nozzle end 121. The projected apex angle of the frusto-conical surface 122 is preferably of the order of substantially 80 degrees. Internally of the cylindrical body portion 118, adjacent the discharge end 121, is an integral central portion 123 having a central bore 124 and a plurality of peripherally spaced passages 125 thereabout providing for passage of the greasing material through the portion 123. Slidably mounted in the bore 124 is the shaft body 126 of a nozzle closing poppet element 127 having a frusto-conical head 128 complementary to the frusto-conical surface 122 to close the nozzle outlet opening defined thereby. The edges of the head 128 are preferably chamfered at 129 in a frusto-conical continuation of the frusto-conical outer surface of the nozzle end 121. The lower edge of the surface 122 and the adjacent edge of head 128 of poppet element 127 are preferably relieved to present a smooth rounded surface at each edge. A washer 131 having a spring seat 132 is slidable on the shaft 126 and maintained in adjusted position by a nut 133 threaded on the end of the shaft. A compression spring 134 is disposed between the washer 131 and the central portion 123 in the cylindrical body portion 118, and biases the head 128 into nozzle closing contact with the surface 122.

Figure 4:
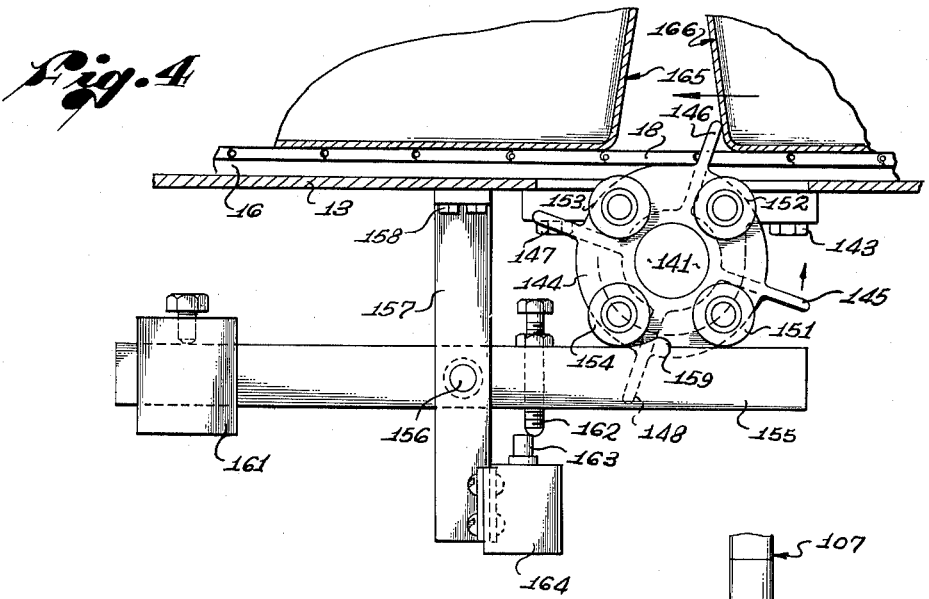
FIG. 4 is a detail sectional view on the line 4—4 of FIG. 2 showing the synchronizing actuator for the spray means.
Figure 5:
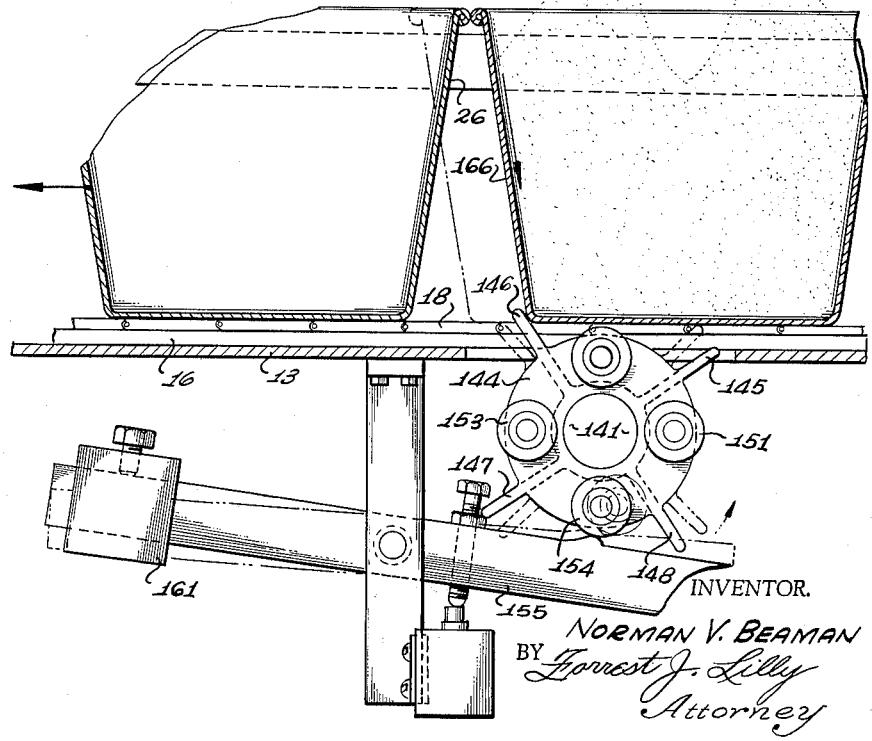
FIG. 5 is a sectional view similar to FIG. 4 showing the parts in full line in their positions when the spray is being applied.

Referring more particularly to FIGS. 2, 4 and 5, the mechanism for synchronizing the spray of greasing material with a baking pan position will now be described. A stub shaft 141 is suspended from the under surface of the platform 13 by a bracket 142 suitably bolted thereto, as at 143. Upon the stub shaft 141 is rotatably mounted a wheel 144 having radially projecting fingers 145, 146, 147 and 148 equally spaced therearound. Cam rollers 151, 152, 153 and 154 are mounted on a side face of the wheel 144 and are equally spaced circumferentially about the axis of rotation of the wheel. A valve-actuating lever 155 is pivotally mounted at 156 upon a bracket 157 mounted on the under surface of the platform 13, as at 158. The lever 155 has a camming projection 159 on its upper surface which is engaged by the cam rollers 151–154 to effect oscillatory movement of the lever 155. An adjustably positioned weight 161, or other biasing means, is provided to bias the lever 155 against the cam rollers 151–154. An adjustable abutment screw 162 is threaded in the lever 155 and has its end engageable with the operating plunger 163 of a three-way air valve 164 mounted on the bracket 157. The pans of the set 25 which are shown in FIGS. 4 and 5 are designated 165 and 166 for descriptive purposes.

The pneumatic system for effecting operation of the oil pump and nozzle unit 80 is shown diagrammatically in FIG. 7. A high pressure air supply feed through line 171 to a pair of regulators 172 and 173 having high and low regulated pressure outlets. The outlet from the low pressure regulator 173 feeds the inlet line 174 for the control valve 164. The valve 164 has an outlet connected to a control line 175, and an exhaust outlet, with the valve 164 selectively connecting the line 175 to the inlet line 174 or to exhaust. The high pressure regulator 173 has its outlet feeding the inlet line 176 of a main valve 177 which is also three-way and is pneumatically operated from the control line 175. The pressure outlet of the valve 177 connects to line 178 leading to the inlet fitting 96 and the actuating side of the piston 92. The valve 177 selectively connects the line 178 to the high pressure line 176 and to the exhaust outlet of the valve.

In the operation of the pan greasing apparatus according to the present invention, the reservoir 67 is filled with greasing oil and is brought up to temperature under control of the thermostat 69. Preliminary adjustments are made to arrange the apparatus for operation on the particular size pan which is to be greased. The lateral guide rods 26 and 27 are adjusted to the desired spacing transversely of the table 12 by rotation of the handles 37 and 44. The pump and nozzle units 80 are adjusted transversely of the table 12 on the rods 78 to secure the proper spacing therebetween ad along the axes of the pans to be spray coated with the greasing oil. The blocks 76 and 77 are adjusted longitudinally of the table 12 on the rods 74 and 75, respectively, so as to place the spray nozzles substantially in line with the longitudinal axis of a pan when the greasing oil is sprayed therefrom. The horizontal frame formed by the bars 54, 55 and rods 59 is then place dat the proper distance above the table 12 so that the rollers 61 clear the top edges of the pans, this latter adjustment being accomplished by rotation of the handle 64 to move the parallelograms formed by the plates 52, bars 54, 55, and rods 57. The driving motor for the belts 17 and 18 is now started and drives the sprockets 22 in tandem to effect movement of the belts longitudinally of the surface of the platform 13. The sets 25 of baking pans may be manually or mechanically loaded on the belts and will move automatically along the table 12 between the lateral guide rods 26 and 27.

FIG. 4 shows the arrangement of the parts with the spray coating of the interior surfaces of the pan 165 completed, and with the side of the pan 166 just engaged with the finger 146. Continued movement of the pan 166 will effect rotation of the wheel 144 in a counterclockwise direction. The cam wheel 154 rides up the cam projection 159 as the wheel 144 rotates and effects rotation of the lever 155 in a clockwise direction about its pivotal mounting 156. This moves the abutment screw 162 downwardly against the valve-operating plunger 163 and, when the parts are substantially in the positions shown in FIG. 5, the valve 164 is opened to connect the control line 175 to the valve inlet line 174. This applies control pressure on the valve 177 to effect opening thereof to connect the power outlet line 178 to the valve inlet line 176. From the line 178 high pressure air is applied to the power face of the piston 92. The valve 177 is preferably of the poppet type, so that full air pressure thrust will be applied to the piston 92 all at once as the valve opens. The piston 92 is thus driven toward the right as viewed in FIG. 6, into its dotted line position. This moves the oil piston 88 toward the right and, when the piston seals off the oil inlet passage 86, pressure is applied to the oil in the chamber 87 so that as the piston 88 moves toward the right, oil is forced under pressure through the outlet passage 103, chamber 104, outlet passage 106, into the central bore of the nozzle body 118 and through the passages 125 to the nozzle outlet. When sufficient pressure is built up behind the head 128 of the nozzle poppet 127, it will be forced open against the bias of the spring 134 and the greasing oil will be sprayed from the nozzle in a burst of a substantially uniform dispersion of tiny droplets, as shown in FIG. 5.

By changing the bias of spring 134 through the nut 133 the oil pressure at which the poppet 127 opens can be adjusted. By adjusting the position of the stop 111 the stroke of the oil piston 88, and therefore the quantity of oil ejected, can be controlled. The spray nozzles 107 are spaced longitudinally along the length of the baking pans, as shown in FIG. 1, to secure substantially uniform coverage throughout the entire length of the pan. The adjustments of the pressure and quantity of greasing oil sprayed out of the nozzles will insure uniform coating of the pans regardless of variation in size.

As the pan 166 continues to move toward the left as viewed in FIGS. 4 and 5, the cam roller 154 rides down the back portion of the camming projection 159 to permit the lever 155 to rotate counterclockwise under the biasing force applied thereto, as by the weight 161. The abutment screw 162 is moved upwardly and permits the valve plunger 163 to move therewith to close the valve 164. This is the dotted line position shown in FIG. 5. With the valve 164 closed, the control line 175 is connected to atmosphere to remove the operating pressure from the valve 177, which now closes and connects the high pressure line 178 to atmosphere. This exhausts the chamber 93 in front of the piston 92 which is moved back into its full line position of FIG. 6 by the spring 99. In the movements of the piston 92 air flows freely from and into the inactive portion of the chamber 93 through the exhaust outlet 101.

At the conclusion of the forward movement of the oil piston 88, the oil pressure in the nozzle drops and the poppet 127 closes under the influence of the spring 134. The check ball 108 will also close the outlet 103, but this is a mere additive effect as long as the nozzle 107 is mounted in place. As the oil piston 88 is retracted by the piston 92 under the bias of the spring 99, it will first draw a vacuum in the cylinder chamber 87 until the end of the oil piston begins to uncover the oil inlet passage 86, whereupon greasing oil will flow into the cylinder 87 through the passage 86 from the inlet 85, supplied by the tubing 72 from the reservoir 67. At the conclusion of the retraction of the pistons 92 and 88, the pump and nozzle unit 80 will be as shown in full lines in FIG. 6—ready for a new application of high pressure air to piston 92 to again eject high pressure oil through the nozzle 107.

In the dotted line position of FIG. 5, the fingers 145 and 146 on the wheel 144 are just beneath the bottom of the pan 166, with the finger 145 pressed thereagainst. In this dotted line position the cam roller 154 has been moved past the dead center of the wheel 144, and the bias on the lever 155 forces the lever against the roller 154 and tends to rotate the wheel 144 in a counterclockwise direction, which is prevented by the bottom of the pan 166. However, as soon as the right-hand edge of the pan 166 clears the finger 145, the wheel 144 will be rotated in a forward or counterclockwise direction to project the finger 145 into the path of the next succeeding pan after 166. The parts will then be related as in the position of FIG. 4, but with the wheel 144 advanced through 90 degrees, so that the finger 145 projects above the endless belt 18 in the path of the baking pans and the cam wheel 153 is in position to engage the cam projection 159 when the wheel 144 is rotated by the next succeeding baking pan to be greased.

The adjustment of the abutment screw 162 relative to the valve-operating plunger 163 is such that the valve 164 is opened while the cam wheels 151–154 are adjacent the highest rise of the cam projection 159, and so that the valve 164 closes when the cam wheels ride down the sharp back slope of the cam projection into the dotted line position of FIG. 5, the valves 164 and 177 being closed and the pistons 92 and 88 moving back while a pan is riding over a pair of fingers as shown in dotted lines in FIG. 5. This insures full retraction of the pistons and filling of the cylinder chamber 87 with greasing oil prior to the next greasing operation, and permits high speed operation of the apparatus since maximum time in the operating cycle is given for return movement of the parts.

At the completion of the greasing operations on a set 25 of baking pans, they may be removed from the table 12 manually or by any desired mechanical means, such as automatic conveyors or other transport.

While a certain preferred embodiment of this invention has been specifically illustrated and described, it will be understood that the invention is not limited thereto as many variations will be apparent to those skilled in the art, and the invention is to be given its broadest interpretation within the terms of the following claims.

What is claimed is:

1. Apparatus for greasing baking pans comprising: a spray nozzle; means for forcibly ejecting greasing material from said nozzle in periodic relation to the passing of a baking pan past the nozzle; means for advancing the baking pans past the nozzle in succession; means mounting said nozzle to vary the position thereof relative to said advancing means in various directions, including longitudinally and transversely of said advancing means and vertically with respect thereto, said mounting means including a pair of spaced parallelograms disposed in vertical planes and provided with horizontally disposed corner pivots; means interconnecting said parallelograms for common movement; and means mounting said nozzle on said parallelograms so as to be vertically movable therewith.

2. Apparatus for greasing baking pans comprising: a spray nozzle; means for forcibly ejecting greasing material from said nozzle in periodic relation to the passing of a baking pan past the nozzle; means for advancing the baking pans past the nozzle in succession; means mounting said nozzle to vary the position thereof relative to said advancing means in various directions, including longitudinally and transversely of said advancing means and vertically with respect thereto, said mounting means including a pair of spaced parallelograms disposed in vertical planes and provided with horizontally disposed corner pivots; means interconnecting said parallelograms for common movement; means mounting said nozzle on said parallelograms so as to be vertically movable therewith; and means mounting said parallelograms upon horizontal pivots spaced horizontally from the inclined legs thereof so as to minimize the horizontal travel of the nozzle body as it is raised vertically.

3. Apparatus for greasing baking pans comprising: a spray nozzle; means for forcibly ejecting greasing material from said nozzle in periodic relation to the passing of a baking pan past the nozzle; means for advancing the baking pans past the nozzle therebelow in succession; means mounting said nozzle to vary the position thereof relative to said advancing means in various directions, including longitudinally and transversely of said advancing means and vertically with respect thereto, said mounting means including a pair of spaced parallelograms disposed in vertical planes and provided with horizontally disposed corner pivots; means mounting said nozzle on said parallelograms so as to be vertically movable therewith; and roller means on said parallelograms positioned to be engageable by the top edges of pans passing therebeneath to prevent the pans from contacting the nozzle.

4. Apparatus for greasing baking pans comprising: a spray nozzle; means for forcibly ejecting greasing material from said nozzle to coat the interior surfaces of a baking pan therewith; means for supporting a pan to be greased in position to receive the spray from said nozzle; and means for adjusting supportably supporting said nozzle to accommodate different sized pans including a pair of vertical parallelograms including four sides pivoted at their ends and having the upper and lower sides substantially horizontal; means pivoting the other two sides of each of the parallelograms to relatively stationary pivots which are arranged substantially at the corners of a rectangle; readily adjustable means for determining the collapse or expansion of said parallelograms to determine the height of the upper sides thereof; and means mounting said nozzle on said upper sides so as to be movable therewith to adjusted vertical positions.

5. Apparatus for greasing baking pans comprising: a spray nozzle; means for forcibly ejecting greasing material from said nozzle to coat the interior surfaces of a baking pan therewith; means for supporting a pan to be greased in position to receive the spray from said nozzle; and means for adjustably supporting said nozzle to accommodate different sized pans including a pair of vertical parallelograms including four sides pivoted at their ends and having the upper and lower sieds substantially horizontal; means pivoting the other two sides of each of the parallelograms to relatively stationary pivots which are arranged substantially at the corners of a rectangle; readily adjustable means for determining the collapse or expansion of said parallelograms to determine the height of the upper sides thereof; and means mounting said nozzle on said upper sides so as to be movable therewith to adjusted vertical positions, said nozzle mounting means including means for effecting adjusted movement of the nozzle both transversely and longitudinally of the upper parallelogram sides so as to give universal adjustment for the nozzle position.

6. Apparatus for greasing baking pans comprising: a spray nozzle; means for forcibly ejecting greasing material from said nozzle to coat the interior surfaces of a baking pan therewith; means for supporting a pan to be greased below the nozzle in position to receive the spray from said nozzle; and means for adjustably supporting said nozzle to accommodate different sized pans including a pair of vertical parallelograms including four sides pivoted at their ends and having the upper and lower sides substantially horizontal; means pivoting the other two sides of each of the parallelograms to relatively stationary pivots which are arranged substantially at the corners of a rectangle; readily adjustable means for determining the collapse or expansion of said parallelograms to determine the height of the upper sides thereof; at least one cross bar interconnecting said upper parallelogram sides and extending across the baking pan so as to hold it against involuntary movement upwardly; and means mounting said nozzle on said upper sides so as to be movable vertically therewith and wtih the cross bar mounted thereon.

7. Apparatus for greasing baking pans comprising: a spray nozzle; means for forcibly ejecting greasing material from said nozzle in periodic relation to the passing of a baking pan past the nozzle; means for advancing the baking pans past the nozzle in succession; supporting posts at opposite sides of the path of pan movement and spaced longitudinally thereof to be located substantially at the corners of a rectangle; generally triangular plates pivoted at one corner on said supporting posts and having their planes extending parallel to the path of pan movement; generally parallel bars pivotally connected to the other corners of the triangular plates at each side of the path of pan movement so as to form therewith susbtantially vertical parallelograms in which the top connecting bars are substantially horizontal and remain so during vertical movement; means for simultaneously adjusting the amount of collapse or expansion of both said parallelograms; and means mounting said nozzle on the top bars of the parallelograms so as to be adjustable vertically therewith.

8. Apparatus for greasing baking pans comprising: a spray nozzle; means for forcibly ejecting greasing material from said nozzle in periodic relation to the passing of a baking pan past the nozzle; means for advancing the baking pans past the nozzle in succession; supporting posts at opposite sides of the path of pan movement and spaced longitudinally thereof to be located substantially at the corners of a rectangle; generally triangular plates pivoted at one corner on said supporting posts and having their planes extending parallel to the path of pan movement; generally parallel bars pivotally connected to the other corners of the triangular plates at each side of the path of pan movement so as to form therewith substantially vertical parallelograms in which the top connecting bars are substantially horizontal and remain so during vertical movement; means for simultaneously adjusting the amount of collapse or expansion of both said parallelograms; means mounting said nozzle on the top bars of the parallelograms so as to be adjustable vertically therewith; and a cross bar connected to said top parallelogram bars at least adjacent one end thereof to extend across the path of pan travel and hold the pins against involuntary upward movement.

9. Apparatus for greasing baking pans comprising: a spray nozzle; means for forcibly ejecting greasing material from said nozzle in periodic relation to the passing of a baking pan past the nozzle; means for advancing the baking pans past the nozzle in succession; means mounting said nozzle to vary the position thereof relative to said advancing means in various directions, including longitudinally and transversely of said advancing means and vertically with respect thereto, said mounting means including a pair of spaced parallelograms disposed in vertical planes and provided with horizontally disposed corner pivots; means interconnecting said parallelograms for common movement; means mounting said nozzle on said parallelograms so as to be vertically movable therewith; rotatable means having peripherally spaced, radially extending fingers projecting into the path of movement of said pans so that their advance is accompanied by rotation of said fingers; cam actuators rotating with said fingers; a first valve means operated by said cam actuators; a second valve means operated by said first valve means; and pump means operated by said second valve means to eject the greasing material under pressure from said nozzle at a predetermined point in the passage of a baking pan past the nozzle.

10. Apparatus for greasing baking pans comprising: a spray nozzle; means for forcibly ejecting greasing material from said nozzle in periodic relation to the passing of a baking pan past the nozzle; means for advancing the baking pans past the nozzle in succession; means mounting said nozzle to vary the position thereof relative to said advancing means in various directions, including longitudinally and transversely of said advancing means and vertically with respect thereto, said mounting means including a pair of spaced parallelograms disposed in vertical planes and provided with horizontally disposed corner pivots; means interconnecting said parallelograms for common movement; means mounting said nozzle on said parallelograms so as to be vertically movable therewith; rotary means having peripherally spaced, radially extending fingers projecting into the path of movement of said pans so that their advance is accompanied by rotation of said fingers; cam actuators rotating with said fingers; valve means operated by said cam actuators; pump means operated by said valve means to eject greasing material under pressure from said nozzle at a predetermined point in the passage of a baking pan past the nozzle, said cam actuators closing said valve means to effect retraction of the pump means while the bottom of a newly sprayed pan is passing over the just operated and next succeeding fingers on the rotary means; and means biasing said rotary means for additional progressive rotation as said next succeeding finger clears the pan bottom to move it into position to be engaged by the next succeeding pan.

11. Apparatus for greasing baking pans comprising: a spray nozzle; means for forcibly ejecting greasing material from said nozzle in periodic relation to the passing of a baking pan past the nozzle; means for advancing the baking pans past the nozzle in succession; means mounting said nozzle to vary the position thereof relative to said advancing means in various directions, including longitudinally and transversely of said advancing means and vertically with respect thereto, said mounting means including a pair of spaced parallelograms disposed in vertical planes and provided with horizontally disposed corner pivots; means interconnecting said parallelograms for common movement; means mounting said nozzle on said parallelograms so as to be vertically movable therewith; a rotary wheel having a plurality of circumferentially spaced cam rollers mounted thereon and a plurality of circumferentially spaced fingers projecting radially therefrom and disposable in the path of advancement of said pans; a valve operator; a valve operated by said valve operator; means operated by opening of said valve for forcibly ejecting greasing material from the nozzle; a cam surface successively engageable by said cam rollers for moving said valve operator to effect periodic ejection of greasing material from the nozzle as the wheel is periodically rotated by engagement of said fingers by pans moving over the wheel, said cam rollers leaving said cam surface to close the valve while a pan is moving past the stationary wheel so as to permit the return of the ejecting means to normal position during the dwell of the device; and means biasing said valve operator against said cam rollers to provide for forward rotation of said wheel thereby as the next succeeding finger clears the bottom of a pan passing over the wheel so as to project said next succeeding finger into the path of the next succeeding pan for positive movement thereby to move the valve operator against the bias.

References Cited by the Examiner

UNITED STATES PATENTS

| | | | |
|---|---|---|---|
| 2,499,621 | 3/1950 | Archer | 118—2 |
| 2,747,539 | 5/1956 | Peffer | 118—2 |
| 2,962,227 | 11/1960 | Whitehurst | 239—453 |
| 3,065,106 | 11/1962 | Rhodes et al. | 118—2 X |
| 3,069,099 | 12/1962 | Graham | 239—453 |
| 3,202,359 | 8/1965 | Gill | 239—172 X |

DANIEL BLUM, *Primary Examiner.*